C. TRUITT.
STEAM COOKER AND HOT PLATE.
APPLICATION FILED APR. 25, 1916.
1,219,200.
Patented Mar. 13, 1917.
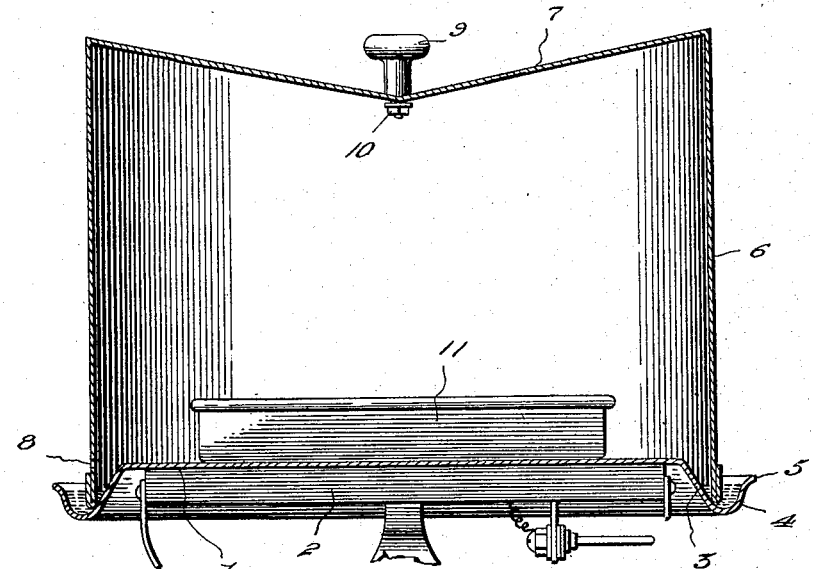
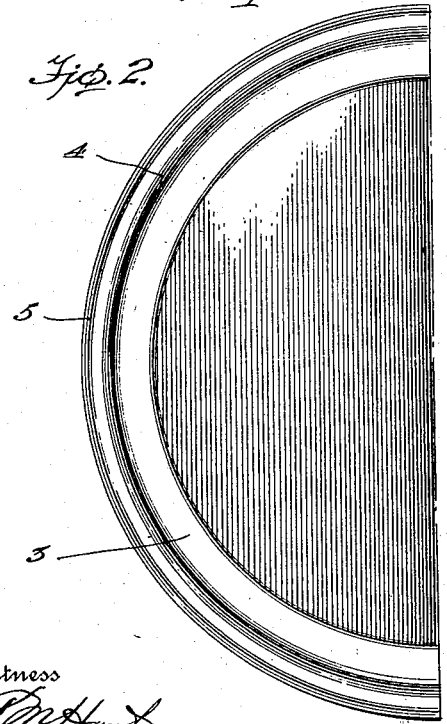
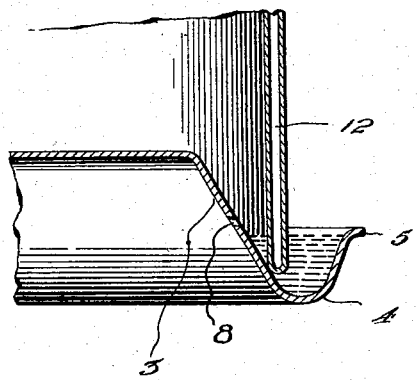
Witness
PM Hunt
Inventor
Clarence Truitt
By Edson Bros.
Attorneys

UNITED STATES PATENT OFFICE.

CLARENCE TRUITT, OF POMONA, CALIFORNIA.

STEAM-COOKER AND HOT-PLATE.

1,219,200.   Specification of Letters Patent.   Patented Mar. 13, 1917.

Application filed April 25, 1916.  Serial No. 93,546.

*To all whom it may concern:*

Be it known that I, CLARENCE TRUITT, a citizen of the United States, residing at Pomona, in the county of Los Angeles and State of California, have invented certain new and useful Improvements in Steam-Cookers and Hot-Plates; and I do hereby declare the following to be a full, clear, and exact description of the invention, such as will enable others skilled in the art to which it appertains to make and use the same.

This invention is a steam cooker and hot plate designed more particularly for use in connection with electric ranges, although equally applicable for employment in connection with individual electric heaters.

In electric cooking devices, considerable heat is wasted by cooking vegetables, meats or other substances on top of a heating element in an ordinary cooker. This loss of heat is due to the radiation of heat from the hot plate and from around the cooking vessel and the heating element.

The invention aims to increase the efficiency of the cooker and to save the heat units of its electric heater, thereby increasing the efficiency of the device as a cooker.

Broadly stated, the invention comprises an ordinary hot plate, which may be used in connection with a separate electrical heating element, or may form a portion of an electric range, the hot plate being ordinarily used for frying or otherwise cooking articles of food. This hot plate is provided with means, such as a trough, for receiving the moisture of condensation, the fluid in the trough becoming lodged between the cover and the hot plate to prevent the escape of vapor from the receptacle, and thereby retain the heat within the interior of the cooker. The cooker is so constructed that the fluid condensed on the top thereof may be returned to the cooking vessel, which may be positioned on the hot plate, and this returning fluid may be utilized as means to baste meats when they are placed within the cooker.

One embodiment of the invention is disclosed in the accompanying drawings, but it is to be understood that the construction therein shown is for the purposes of illustration only, and not as defining the limits of the invention.

In the drawings:—

Figure 1 is a vertical sectional view through the cooker and the hot plate.

Fig. 2 is a plan view of the hot plate.

Fig. 3 is an enlarged detail view of a portion of the hot plate, disclosing the fluid channel, and a portion of the insulating cover.

The invention is intended for use in connection with the cooking of meats and vegetables, wherein it is desired to insure a uniform disposition of heat around the substance to be cooked and to prevent the escape of heat units from the interior of the cooker or cover by causing the water of condensation to flow down the sides of the cooker into the trough-like outer edge of the hot plate, the fluid level of which is on a plane below that of the plate, so that the water of condensation cannot flow over the surface of the hot plate and into contact with the substance being cooked thereon.

Referring more particularly to the embodiment of the invention illustrated in the drawings, the hot plate is indicated at 1 and may be of any suitable material. It is shown circular in form. This plate may be mounted upon an ordinary electrical heating element, or may be secured at a predetermined point on an electric range, the heating element indicated at 2, being in contact or in substantial contact, with the underface of the plate 1. This plate is preferably formed at its outer edge with a downwardly and outwardly inclined portion indicated at 3, thence formed into a trough or channel indicated at 4 and thence terminating in an outer edge 5 which is turned over and outwardly away from the main body of the plate. This edge 5 of the plate is preferably on a plane below that of the main body 1, so that should the moisture exceed the capacity of the channel 4, it will flow over the edge 5 and away from the body of the plate instead of flowing on to the body 1 of the plate.

The cover or cooker is shown in Fig. 1 as a substantially circular vessel having a side wall 6 and a top 7. The side wall may be provided with a steam vent 8, if desired, which vent is preferably positioned through the wall 6 slightly above the water level of the channel or water trough 4. The body of the cooker is preferably concave or in the form of an inverted cone. At the central portion of this top, or at the apex of the cone, there may be provided suitable means, such as a knob 9, serving as a handle for the cooker. This knob may be provided with means to secure the same to the top 7, such means including a screw or other fastening element which may coöperate with the nut 10.

In operation, the substance to be cooked may be placed in an ordinary vessel, indicated at 11, which may contain water or other fluid and this vessel 11 may be placed directly in contact with the hot plate 1. As the contents of the vessel 1 become heated, the fluid condenses against the top 7 or the wall 6 of the cooker. If the fluid is condensed on the top 7 it will run down the top surface toward the center thereof, from which it will drop on to the substance being cooked in the vessel 11. If the article of food in the vessel 11 should be meat, the returning fluid will serve to baste the food. The moisture condensed on the wall 6 will flow down the wall and into the trough or groove 4 where it will collect and serve to prevent the escape of heat between the wall 6 and plate 1 at the groove 4 until the moisture in the groove shall have been dissipated by the plate.

The steam vent 8 precludes pressure of steam from becoming too great, and thereby prevents the lifting of the lid from the plate. By this arrangement, the plate can be maintained at its maximum efficiency, as the fluid of condensation will either be returned to the cooking vessel 11 or carried away from the plate 1 to the trough 4. If desired, the cover wall 6 and top 7 may be a double wall, to provide a space 12 for insulation, either insulating material (not shown) or a vacuum space, as further means to prevent loss of heat.

Having thus described my invention, and a manner of using the same, what I claim as new and desire to secure by Letters Patent of the United States, is:—

1. An electric cooker comprising a plate having an annular trough adapted to receive fluid of condensation, the fluid level of which is on a plane below that of the body of the plate, and a cover having a double wall to provide a space for insulation, the wall of said cover being adapted to be seated against an inclined side of the trough and into the fluid of condensation in said trough.

2. An electric cooker comprising a plate having an annular trough adapted to receive fluid of condensation, the fluid level of which trough is on a plane below that of the body of the plate, and a cover, the wall of which is adapted to be seated in the trough of said plate.

3. In an electric cooker, a plate having a trough formed at its outer edge continuously around the plate by providing the plate with a downwardly inclined wall and then bending the wall upwardly to a point less than the depth of the downwardly inclined wall to thereby provide a trough on a plane below that of the plate, and a cover provided with a side wall which is adapted to be seated in the trough of the plate.

4. An electric cooker comprising a plate having a trough formed at the outer edge thereof continuously around the plate, the trough being on a plane below that of the plate, means to heat the plate and a cover provided with a concave top to direct the fluid of condensation toward the center of the plate.

5. An electric cooker comprising a plate having a trough formed at the outer edge thereof on a plane below that of the plate, means to heat said plate and a cover provided with a concave top, the side wall of which is adapted to be seated in the trough of the plate to permit the moisture on the side wall to flow into said trough and to be there deposited, and to permit the moisture of condensation to flow toward the center of the top of said cover to be returned to the substance to be cooked.

6. An electric heater comprising a plate having a trough formed at its outer edge continuously around the plate and on a plane below that of the top of the plate, the cover coöperating with said plate, said cover being provided with a substantially concave top in the form of an inverted cone, the side wall of the cover being seated in said trough, and a handle extending from the top of the cover at the center thereof and operating to direct the fluid of condensation flowing from the center of said top on to said plate.

In testimony whereof, I affix my signature.

CLARENCE TRUITT.

Copies of this patent may be obtained for five cents each, by addressing the "Commissioner of Patents, Washington, D. C."